United States Patent [19]

Terai

[11] Patent Number: 5,730,011
[45] Date of Patent: Mar. 24, 1998

[54] MOUNTING STRUCTURE FOR STEERING LOCK APPARATUS

[75] Inventor: Takehiro Terai, Atsugi, Japan

[73] Assignee: Nissan Motor Co., Ltd., Yokohama, Japan

[21] Appl. No.: 660,473

[22] Filed: Jun. 7, 1996

[30] Foreign Application Priority Data

Jun. 8, 1995 [JP] Japan ................................. 7-141901

[51] Int. Cl.⁶ ............................................ B60R 25/02
[52] U.S. Cl. ...................... 70/186; 70/237; 70/252; 70/370; 70/371; 70/422; 74/493
[58] Field of Search .................. 70/252, 237, 182–186, 70/370, 371, 373, 422, 453; 280/775; 74/493

[56] References Cited

U.S. PATENT DOCUMENTS

| | | | |
|---|---|---|---|
| 2,040,258 | 5/1936 | Jacobi | 70/370 |
| 4,442,688 | 4/1984 | Saegusa | 280/775 X |
| 4,798,067 | 1/1989 | Peitsmeier et al. | 70/252 |
| 5,211,042 | 5/1993 | Watanuki | 70/186 X |

FOREIGN PATENT DOCUMENTS 0094568  11/1983  European Pat. Off. ............... 70/252

Primary Examiner—Lloyd A. Gall
Attorney, Agent, or Firm—Foley & Lardner

[57] ABSTRACT

In a structure for mounting a steering lock apparatus having a key cylinder unit fixed to an instrument panel and a key lock unit for permitting or regulating rotation of a steering shaft whose tilting is freely changed, a key cylinder interposing unit through which an end of the key cylinder unit is interposed and supported is formed in a plate bracket fixed in the instrument panel side, protrusions projecting upward are provided in an end of the key cylinder unit and an engaging groove for regulating rotation of the key cylinder unit by engaging with both sides of the protrusions and functioning as a stress concentration part for a load applied upward from the key cylinder unit is formed in the key cylinder interposing part.

2 Claims, 3 Drawing Sheets

MOUNTING STRUCTURE FOR STEERING LOCK APPARATUS

BACKGROUND OF THE INVENTION

The present invention relates to a mounting structure for an automobile steering lock apparatus.

Conventionally, as a structure for mounting an automobile steering lock apparatus, there has been known a structure disclosed in Japanese Unexamined Patent Publication No. 63-43850. A steering lock apparatus described therein comprises a key cylinder unit and a key lock unit. The key lock unit includes a locking rod and a lock releasing mechanism, wherein the locking rod is placed to slide freely in a rod housing supported by a steering column. The key cylinder unit includes a cylindrical frame and a key cylinder attached to an end of this frame. An end of the key cylinder is fitted to the inner surface of an end of the frame. An end of this frame is fitted into a hole part formed in an instrument panel via a gasket.

In such a structure for mounting a steering lock apparatus, however, it is difficult to completely eliminate a twisting force applied to the key cylinder unit via the key lock unit when a steering column (steering shaft) is moved up and down so as to change a tilt and it is necessary to avoid rotational backlash in an end of the frame generated due to insufficient fitting strength of the gasket. Therefore, its fitting strength must be increased, making it more complex to perform an operation of mounting the key lock unit.

The key lock unit is located above the knees of a driver in a seat. This creates a possibility that when the driver abruptly bends his knees because of the sudden stop of a vehicle, the pushed up knees may directly or indirectly come into contact with the key lock unit. Thus, in order to lighten a burden on the knees, it is necessary to limit fitting strength in a manner that an end of the key cylinder unit is disengaged from the hole part and moved upward when a fixed load is applied. By so doing, however, it would be difficult to prevent aforementioned rotational backlash.

The present invention was made in order to solve such problems created in connection with the conventional structure. An object of the invention is to provide a structure for mounting a steering lock apparatus capable of preventing rotational backlash in a key lock unit without losing mounting operability and reducing a load placed on the pushed up knees.

SUMMARY OF THE INVENTION

In order to achieve the object mentioned above, the invention is characterized in that the mounting structure for the steering lock apparatus is provided with a key cylinder unit having a key inserting part facing the inside of an automobile compartment from an instrument panel in its one end and fixed to the instrument panel and a key lock unit interlockingly linked with the other end of this key cylinder unit for permitting or regulating rotation of a steering shaft with a freely changeable tilt depending on the rotational position of a key interposed into the key inserting part and there are formed in a plate bracket fixed in the instrument panel side a key cylinder interposing part into which an end of the key cylinder unit is inserted and supported, a projection protruding upward on an end of the key cylinder unit and an engaging groove as a stress concentration part with respect to a load applied upward from the key cylinder unit for regulating rotation of the key cylinder unit by engaging with both sides of the projection in the key cylinder interposing part.

According to this structure, even when a twisting force is applied to the key cylinder unit via the key lock unit due to up and down movement of the steering shaft operated so as to change a tilt, the groove part engages with both sides of the projection, thereby controlling rotation of the key cylinder unit. As a result, it is possible to prevent rotation of the key cylinder unit without increasing fitting strength of the key lock unit.

Furthermore, even when a driver suddenly bends his knees and brings his pushed up knees into direct or indirect contact with the key lock unit, since the engaging groove works as a stress concentration part for a load applied upward from the key cylinder unit, the unit quickly and surely breaks loose from this engaging groove. This allows an end of the key cylinder unit to surely move upward during applying of a fixed load and thus makes it possible to lighten a burden on the knees.

A projection may be provided along a line from the surface of the plate bracket to the peripheral part of the key cylinder interposing part.

If this structure is employed, it is possible to limit tilting movement of the key cylinder unit by means of the projection irrespective of a thickness of the plate bracket.

DESCRIPTION OF THE PREFERRED EMBODIMENT

The preferred embodiment of the invention will now be described with reference to the accompanying drawings.

Figure 1:
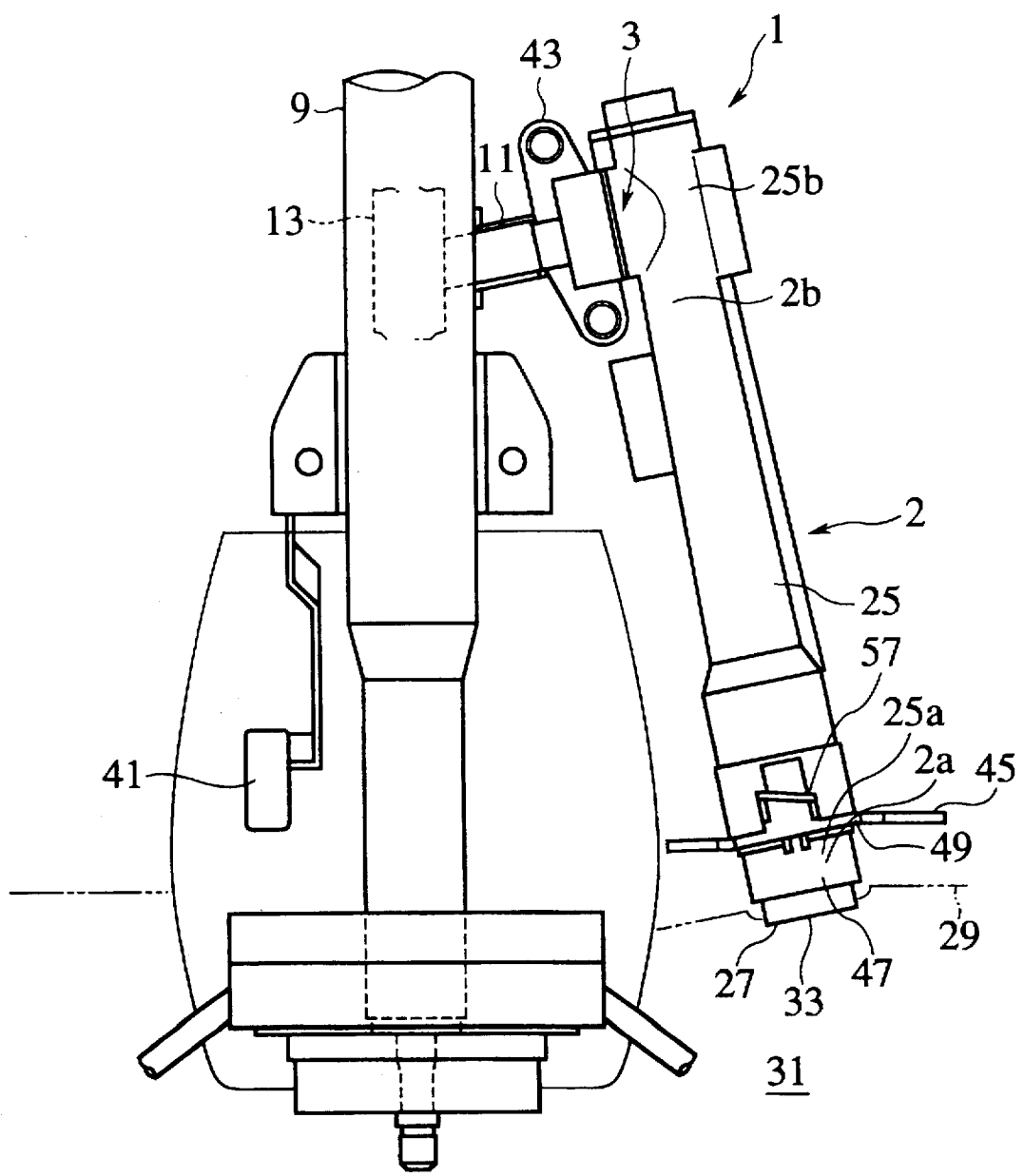
FIG. 1 is a plan view showing a mounting structure for a steering lock apparatus of an embodiment of the invention.
Figure 2:
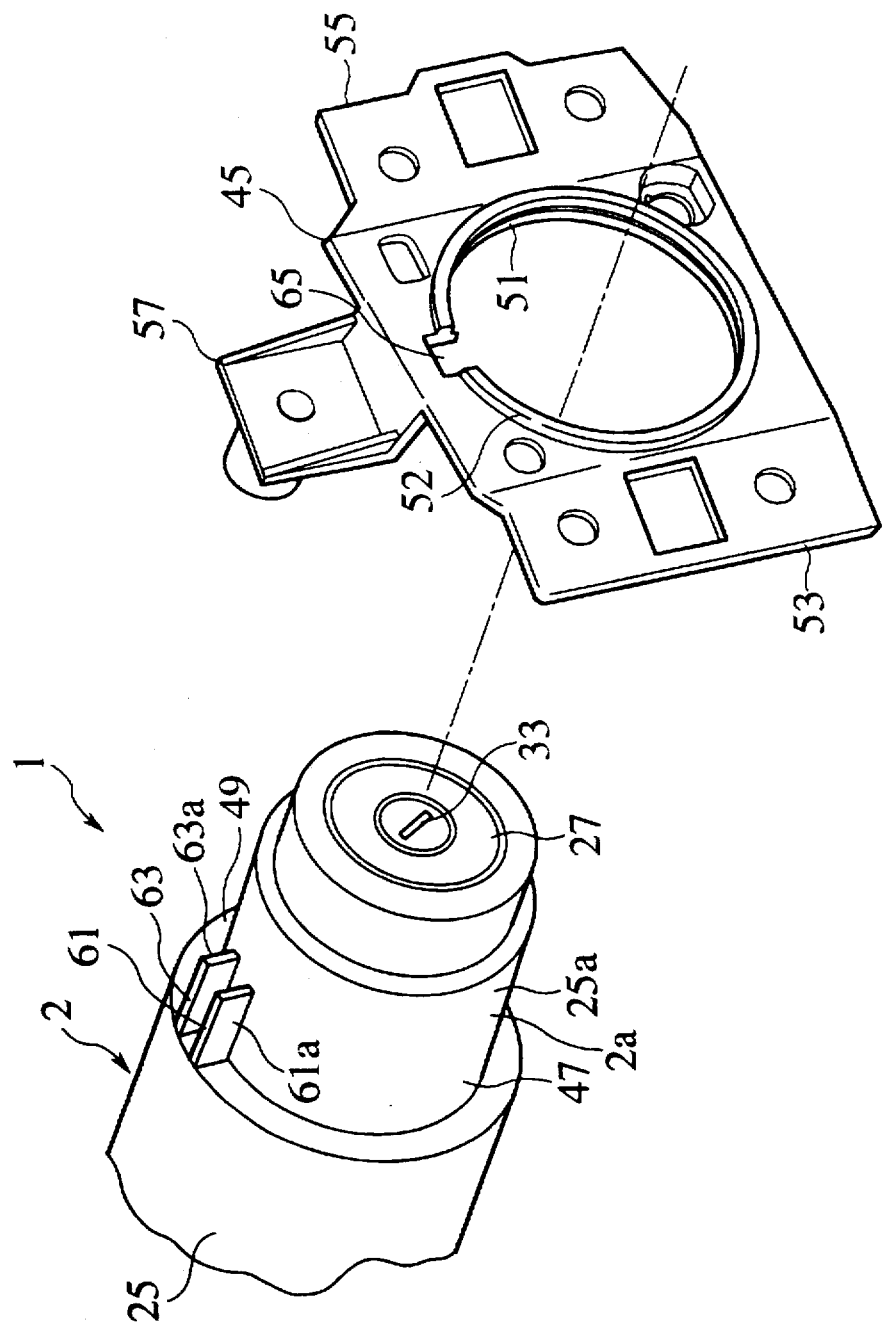
FIG. 2 is a perspective view showing main parts of the structure illustrated in FIG. 1.
Figure 3:
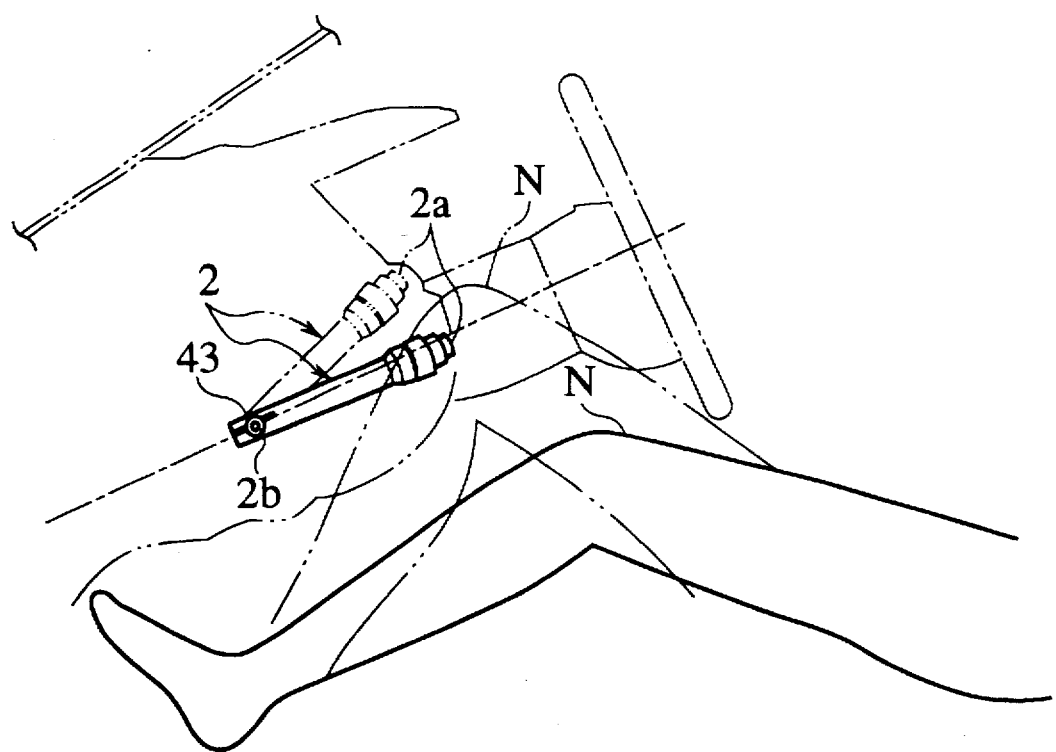
FIG. 3 is a side view showing action of the embodiment.

FIG. 1 is a view in plan illustrating a mounting structure for a steering lock apparatus of an embodiment of the invention, FIG. 2 is a view in perspective illustrating main pans of the structure shown in FIG. 1 and FIG. 3 is a view in side illustrating action of the embodiment.

Referring to FIG. 1, there is shown a steering lock apparatus 1 equipped with a key cylinder unit 2 and a key lock unit 3.

The key lock unit 3 includes a locking rod (not shown) and a lock releasing mechanism (not shown) and the locking rod is placed to slide freely in a rod housing 11 supported by a steering column 9. A lock recessed part (not shown) is formed in a steering shaft 13 interposed through the steering column 9 and a tip of the locking rod is engaged with and disengaged from this lock recessed part.

The lock releasing mechanism (not shown) is equipped with a tappet, a spring and a brake shaft. The brake shaft is provided with a cam for moving the tappet up and down following the rotation of the brake shaft. The tappet is connected to the upper end of the locking rod via the spring. When the tappet moves to the brake shaft side, the locking rod disengages from the lock recessed part, allowing the steering shaft 13 to rotate freely. When the tappet moves to the steering shaft side, the locking rod is pressed by the spring and when the steering shaft 13 is rotated to a specified location, the locking rod engages with the lock recessed part, regulating the rotation of the steering shaft 13.

The key cylinder unit 2 includes a cylindrical frame 25 and a key cylinder 27 attached to an end 25a of this frame 25. A key inserting part 33 facing the inside of an automobile compartment 31 from an instrumental panel 29 is provided on the tip surface of the end of the key cylinder 27. A rotator (not shown) rotated by means of a key (not shown) inserted into the key inserting part 33 is provided inside the key cylinder 27. A work shaft (not shown) extends from the rotator to the other end 25b of the frame 25 and the tip part of this work shaft is interlockingly linked with the locking rod via the brake shaft. This part is formed roughly in a spherical shape and fitted to rotate freely into a fitting recessed part formed in the brake shaft. The rod housing 11 is linked to rotate freely with the frame 25. Thus, with the key cylinder unit 2 fixed to the instrument panel, tilting of the steering column 9 (or the steering shaft 13) can be independently changed.

This changing of tilting of the steering column 9 (or the steering shaft 13) can be realized by operating a tilt lever 41. A hanger 43 is provided projectingly in the rod housing 11 and via this hanger 43 the rod housing 11 is fixed to the bracket (not shown) of the steering column 9. The hanger 43 supports the other end 25b of the frame 25 (or the other end 2b of the key cylinder unit 2) from the lower side.

An end 25a of the frame 25 (or an end 2a of the key cylinder unit 2) is supported by a plate bracket 45 in a plate-like form fixed to the instrument panel 29.

Turning to FIG. 2, there is shown a tip part 47 of the end 25a of the frame 25 formed having a small diameter via a step 49 and there is provided in the plate bracket 45 a key cylinder interposing part 51 roughly in the form of a circular hole through which the tip part 47 is interposed and fitted. A projection 52 along the peripheral part of the key cylinder interposing part 51 is provided projectingly on the surface of the plate bracket 45. Tight connection parts 53, 55 and 57 tightly fixed to a bracket mounting part (not shown) in the instrument panel 29 side are provided in both sides and the upper side of the key cylinder interposing part 51 of the plate bracket 45.

Two plate-like protrusions 61 and 63 projecting upward are provided in the tip part 47 of the frame 25. Both protrusions 61 and 63 are formed integrally with the frame 25 and extends from the step 49 toward the key inserting part 33.

A roughly rectangular engaging groove 65 through which both protrusions 61 and 63 are interposed is notched in the upper part of the key cylinder interposing part 51 of the plate bracket 45. This engaging groove 65 engages with the outer side surfaces (side parts) 61a and 63a of the protrusions 61 and 63, regulates the rotation of the key cylinder unit 2 against the plate bracket 45 and functions as a stress concentration part when a load is given to the plate bracket 45 upward from the key cylinder unit 2.

When the driver puts a key into the key inserting part 33 and rotates it to a fixed starting position, the rotator, the work shaft and the brake shaft rotate in the same direction, the tappet moves to the brake shaft side, the locking rod disengages from the lock recessed part, realizing an unlocked state under which the steering shaft 13 is permitted to rotate. When the driver rotates the key to a fixed pulling out position, the tappet moves to the steering shaft 13 side, the locking rod is pressed by the spring, the locking rod engages with the lock recessed part with the steering shaft 13 rotated to a specified position, realizing a locked state under which the rotation of the steering shaft 13 is regulated.

When the driver operates the tilt lever 41 in order to change tilting of the steering column 9 (or the steering shaft 13), a twisting force is exerted on the end 2a of the key cylinder unit 2 via the key lock unit 3 due to the up and down movement of the steering column 9. However, since the groove part 65 engages with the outer side surfaces 61a and 63a of the protrusions 61 and 63 and controls the rotation of the key cylinder unit 2 in this end 25a, the rotation of the key cylinder unit 2 can be avoided without increasing fitting strength between the tip part 47 of the key cylinder unit 2 and the key cylinder interposing part 51. This makes it possible to prevent rotational backlash from being produced in the key cylinder unit due to the up and down movement of the steering column 9 without losing operability for mounting the key lock unit 2.

As illustrated in FIG. 3, the key lock unit 2 is located above the knee N of the driver in a seat. Thus, when the driver abruptly bends his knee N because of the sudden stop of a vehicle, the pushed up knee N may directly or indirectly come into contact with the end 2a of the key lock unit 2. However, since in the plate bracket 45 the engaging groove 65 functions as a stress concentration part for a load applied upward from the key cylinder unit 2 even when the pushed up knee N comes into strong contact with the key lock unit 2, the unit 2 quickly and surely disengages from the engaging groove 65 because of application of a fixed load. As a result, the key cylinder unit 2 gets free from the plate bracket 45 and rotates around the hanger 43 of the other end 2b and the end 2a is surely moved upward. Thereby, a burden on the knee N can be lightened.

Furthermore, since the projection 52 is provided on the surface of the plate bracket 45 along the peripheral part of the key cylinder interposing part 51, tilting movement of the key cylinder unit 2 roughly within the part 51 can be limited by means of the projection irrespective of a thickness of the plate bracket 45. Therefore, in addition to prevention of the tilting movement of the key cylinder unit 2, the plate bracket 45 can be formed to a thickness having a desired breaking strength. This can reduce a burden on the knee N more exactly.

What is claimed is:

1. A mounting structure for a steering lock apparatus comprising:

a key cylinder unit having a key inserting part facing the inside of an automobile compartment from an instrument panel in a tip of an end thereof and fixed to said instrument panel; and a key lock unit interlockingly linked with the other end of this key cylinder unit for permitting or regulating rotation of a steering shaft whose tilting is freely changed in accordance with a rotational position of a key inserted into said key inserting part, wherein:

a key cylinder interposing part through which an end of said key cylinder unit is interposed and supported is formed in a plate bracket fixed to a side of said instrument panel;

protrusions projecting upward are provided on an end of said key cylinder unit; and an engaging groove in said plate bracket for regulating rotation of said key cylinder unit by engaging sides of said protrusions and functioning as a stress concentration part for a load applied upward from said key cylinder unit.

2. A mounting structure for a steering lock apparatus according to claim 1, wherein a projection is protrudingly provided from a surface of said plate bracket at a peripheral part of said key cylinder interposing part.

* * * * *